US012361858B2

(12) United States Patent
Kim et al.

(10) Patent No.: US 12,361,858 B2
(45) Date of Patent: Jul. 15, 2025

(54) DISPLAY DEVICE, DISPLAY SYSTEM, AND METHOD FOR DRIVING THE SAME

(71) Applicant: SAMSUNG DISPLAY CO., LTD., Yongin-si (KR)

(72) Inventors: Hyunsu Kim, Yongin-si (KR); Jongman Bae, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/517,366

(22) Filed: Nov. 22, 2023

(65) Prior Publication Data

US 2024/0221589 A1 Jul. 4, 2024

(30) Foreign Application Priority Data

Jan. 2, 2023 (KR) ........................ 10-2023-0000132

(51) Int. Cl.
*G09G 3/20* (2006.01)

(52) U.S. Cl.
CPC ....... *G09G 3/2092* (2013.01); *G09G 2310/08* (2013.01); *G09G 2320/0233* (2013.01); *G09G 2340/0435* (2013.01)

(58) Field of Classification Search
CPC ............. G09G 3/2092; G09G 2310/08; G09G 2320/0233; G09G 2340/0435; G09G 3/3208; G09G 2310/061; G09G 2320/0214; G09G 2340/16
See application file for complete search history.

(56) References Cited

U.S. PATENT DOCUMENTS

| | | | | | |
|---|---|---|---|---|---|
| 11,854,476 | B1 * | 12/2023 | Chou | G09G 3/3208 |
| 2015/0206489 | A1 * | 7/2015 | Hwang | G09G 3/3607 345/99 |
| 2016/0372077 | A1 * | 12/2016 | Koo | G09G 3/2096 |
| 2017/0047028 | A1 * | 2/2017 | Seo | G09G 3/3614 |
| 2018/0293949 | A1 * | 10/2018 | Nakamura | G09G 5/399 |
| 2023/0011399 | A1 * | 1/2023 | Kim | H04N 1/32283 |

FOREIGN PATENT DOCUMENTS

KR 10-2022-0022335 2/2022

* cited by examiner

*Primary Examiner* — Md Saiful A Siddiqui
(74) *Attorney, Agent, or Firm* — F. CHAU & ASSOCIATES, LLC

(57) ABSTRACT

A display system includes a display device and a host processor. The display device includes a display panel. The host processor is configured to provide input image data for a current frame and a vertical sync start signal to the display device and to provide the input image data of the current frame and the vertical sync start signal again to the display device in response to receiving a refresh control signal from the display device. The display device is configured to refresh the display panel based on the input image data and the vertical sync start signal, compare the input image data of a previous frame with the input image data of a current frame, and provide the refresh control signal to the host processor based on a result of the compare.

18 Claims, 9 Drawing Sheets

DISPLAY DEVICE, DISPLAY SYSTEM, AND METHOD FOR DRIVING THE SAME

CROSS-REFERENCE TO RELATED APPLICATION

This U.S. patent application claims priority under 35 USC § 119 to Korean Patent Application No. 10-2023-0000132 filed on Jan. 2, 2023 in the Korean Intellectual Property Office (KIPO), the entire disclosure of which is incorporated by reference herein.

1. Technical Field

Embodiments of the present disclosure relate to a display device, a display system, and a method for driving the same. More particularly, embodiments of the present disclosure relate to a display device, a display system, and a method for driving the same, capable of generating a refresh control signal.

2. Discussion of Related Art

A display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals to the gate lines, the data driver may provide data voltages to the data lines, and the timing controller may control the gate driver and the data driver.

The display device may communicate with a host processor by using a mobile industry processor interface (MIPI) protocol. In a command mode of an MIPI, a display system refreshes the display panel in synchronization with an internal synchronization signal generated within the display device. In a video mode of the MIPI, the display system refreshes the display panel in synchronization with a synchronization signal received in frame data transmitted from the host processor.

In other words, in the video mode of the MIPI, the display device refreshes the display panel depending mainly on the host processor. However, due to step efficiency, motion blur may be perceivable by a user when a new image is refreshed at a low driving frequency in the video mode of the MIPI.

SUMMARY

An object of the present disclosure is to provide a display device capable of generating a refresh control signal to prevent motion blur.

Another object of the present disclosure is to provide a display system capable of generating a refresh control signal to prevent motion blur.

Still another object of the present disclosure is to provide a method for driving a display system, capable of driving the display system.

According to an embodiment, a display system includes a display device and a host processor. The display device includes a display panel. The host processor is configured to provide input image data for a current frame and a vertical sync start signal to the display device and to provide the input image data of the current and the vertical sync start signal again to the display device in response to receiving a refresh control signal from the display device. The display device is configured to refresh the display panel based on the input image data and the vertical sync start signal, compare the input image data of a previous frame with the input image data of a current frame, and provide the refresh control signal to the host processor based on a result of the compare.

In an embodiment, the display device may be configured to provide the refresh control signal to the host processor when the input image data of the previous frame is different from the input image data of the current frame.

In an embodiment, the display device may be configured to compare a checksum value of the input image data of the previous frame with a checksum value of the input image data of the current frame to provide the refresh control signal to the host processor.

In an embodiment, the display device may be configured to provide the refresh control signal to the host processor when the checksum value of the input image data of the previous frame is different from the checksum value of the input image data of the current frame.

In an embodiment, the display device may be configured to compare a cyclic redundancy check value of the input image data of the previous frame with a cyclic redundancy check value of the input image data of the current frame to provide the refresh control signal to the host processor.

In an embodiment, the display device may be configured to compare the input image data of the previous frame with the input image data of the current frame to provide the refresh control signal to the host processor at a maximum driving frequency.

In an embodiment, the display device may be configured to compare the input image data of the previous frame with the input image data of the current frame to provide the refresh control signal to the host processor N times, where N is a positive integer greater than or equal to 2.

In an embodiment, the display device may be configured to compare the input image data of the previous frame with the input image data of the current frame to provide the refresh control signal to the host processor when a driving frequency is lower than a reference frequency.

In an embodiment, the display device may be configured to count at each reference time to accumulate a count value when the display device receives the vertical sync start signal and to provide the refresh control signal to the host processor when the count value reaches a reference count value.

In an embodiment, the count value may be reset when the display device receives the vertical sync start signal.

In an embodiment, the reference count value may be a count value corresponding to a minimum driving frequency.

In an embodiment, the host processor may be configured to provide, in a first mode, the input image data and the vertical sync start signal to the display device and to provide the input image data to the display device when the host processor receives the refresh control signal from the display device. In addition, the host processor may be configured to provide, in a second mode, the input image data to the display device and to provide the input image data to the display device when the host processor receives the refresh control signal from the display device.

In an embodiment, the display device may be configured to compare, in the first mode, the input image data of the previous frame with the input image data of the current frame to provide the refresh control signal to the host processor. In addition, the display device may be configured to provide, in the second mode, the refresh control signal to the host processor for each frame.

According to an embodiment, a method for driving a display system including a display device having a display panel is provided. The method includes: a host processor providing input image data for a current frame and a vertical sync start signal to the display device to enable the display device to refresh the display panel; the display device comparing the input image data of a previous frame with the input image data of a current frame; the display device providing a refresh control signal to the host processor based on a result of the compare; and the display device providing the input image data of the current frame and the vertical sync start signal again to the display device in response to the host processor receiving the refresh control signal.

In an embodiment, the display device may be configured to provide the refresh control signal to the host processor when the input image data of the previous frame is different from the input image data of the current frame.

In an embodiment, the display device may be configured to compare a checksum value of the input image data of the previous frame with a checksum value of the input image data of the current frame to provide the refresh control signal to the host processor.

In an embodiment, the display device may be configured to compare a cyclic redundancy check value of the input image data of the previous frame with a cyclic redundancy check value of the input image data of the current frame to provide the refresh control signal to the host processor.

In an embodiment, the display device may be configured to compare the input image data of the previous frame with the input image data of the current frame to provide the refresh control signal to the host processor at a maximum driving frequency.

In an embodiment, the display device may be configured to compare the input image data of the previous frame with the input image data of the current frame to provide the refresh control signal to the host processor N times, where N is a positive integer greater than or equal to 2.

In an embodiment, the display device may be configured to compare the input image data of the previous frame with the input image data of the current frame to provide the refresh control signal to the host processor when a driving frequency is lower than a reference frequency.

According to an embodiment, a display device includes a display panel including pixels, a data driver configured to provide data voltages to the pixels, a gate driver configured to provide gate signals to the pixels, and a timing controller configured to control the data driver and the gate driver. The timing controller is configured to receive input image data and a vertical sync start signal from an external device to refresh the display panel, compare the input image data of a previous frame with the input image data of a current frame, and provide a refresh control signal to the external device based on a result of the compare. The external device outputs the input image data of the current frame and the vertical sync start signal to the display device, and outputs the input image data of the current frame and the vertical sync start signal again to the display device in response to receiving the refresh control signal.

Therefore, a display system according to embodiments of the present disclosure may compare input image data of a previous frame with input image data of a current frame to provide a refresh control signal to a host processor, so that a new frame can be inserted when a new image is refreshed. Accordingly, the display system can prevent motion blur caused by step efficiency.

In addition, a display system according to embodiments of the present disclosure may insert a new frame at a high frequency, so that motion blur can be minimized.

Further, a display system according to embodiments of the present disclosure may insert a new frame during low-frequency driving that is relatively vulnerable to motion blur, so that a motion blur can be minimized.

Further, a display system according to embodiments of the present disclosure may generate a refresh control signal when a display panel is not refreshed for a predetermined time (e.g., a minimum driving frequency), so that a luminance variation caused by leakage of transistors constituting pixels of the display panel can be reduced.

DETAILED DESCRIPTION OF THE EMBODIMENTS

Hereinafter, embodiments of the present disclosure will be explained in detail with reference to the accompanying drawings.

Figure 1:
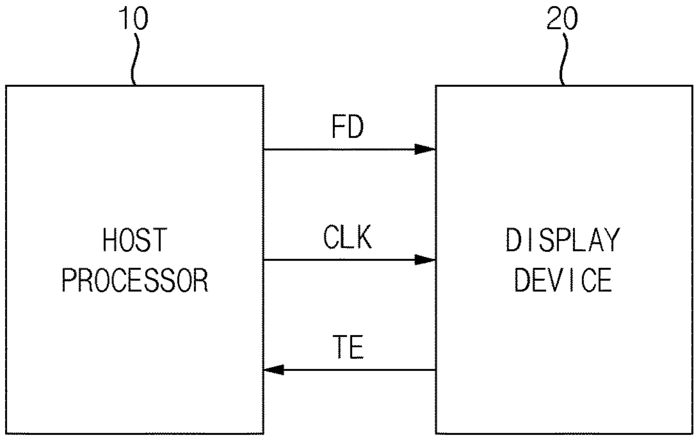
FIG. 1 is a block diagram showing a display system according to an embodiment of the present disclosure.
Figure 2:
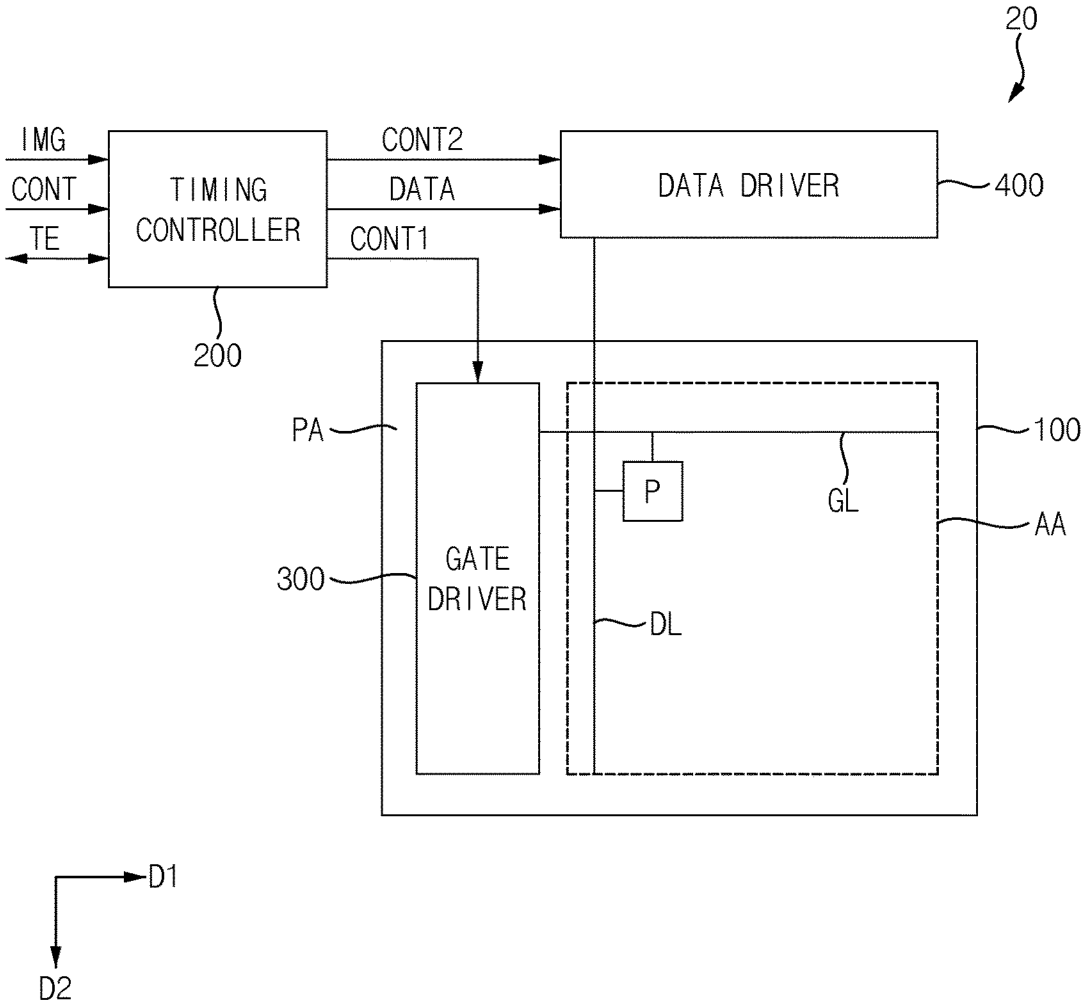
FIG. 2 is a block diagram showing an example of a display device of FIG. 1.

FIG. 1 is a block diagram showing a display system according to an embodiment of the present disclosure, and FIG. 2 is a block diagram showing an example of a display device 20 of FIG. 1.

Referring to FIGS. 1 and 2, a display system may include a host processor 10 and a display device 20.

The host processor 10 may include at least one of a central processing unit (CPU) or an application processor (AP). The host processor 10 may further include at least one of a graphic processing unit (GPU), a communication processor (CP), and an image signal processor (ISP). The host processor 10 may further include a neural processing unit (NPU). The neural processing unit may be a processor specialized in processing of an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of at least two thereof, but is not limited to the examples described above. The artificial intelligence model may additionally or alternatively include a software structure in addition to a hardware structure. At least two of the processing units and the processors described above may be implemented as one integrated component (e.g., a single chip), or may be implemented as independent components (e.g., a plurality of chips), respectively.

The display device 20 may include a display panel 100, a timing controller 200, a gate driver 300, and a data driver 400. According to an embodiment, the timing controller 200 and the data driver 400 are integrated on a single chip.

The display panel 100 may include a display part AA configured to display an image, and a peripheral part PA that is adjacent to the display part AA. According to an embodiment, the gate driver 300 is mounted on the peripheral part PA.

The display panel 100 may include a plurality of gate lines GL, a plurality of data lines DL, and a plurality of pixels P electrically connected to the gate lines GL and the data lines DL. The gate lines GL may extend in a first direction D1, and the data lines DL may extend in a second direction D2 intersecting the first direction D1.

The timing controller 200 may receive input image data IMG and an input control signal CONT from the host processor 10. For example, the input image data IMG may include red image data, green image data, and blue image data. According to an embodiment, the input image data IMG further includes white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The gate driver 300 may generate gate signals for driving the gate lines GL in response to the first control signal CONT1 received from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data lines DL.

The display device 20 may communicate with the host processor 10 by using a mobile industry processor interface (MIPI) protocol. For example, the host processor 10 and the display device 20 may communicate with each other through one clock lane and at least one frame data lane.

The host processor 10 may provide frame data FD to the display device 20 through the frame data lane. The host processor 10 may provide a clock signal CLK to the display device 20 through the clock lane.

The MIPI protocol may support a video mode and a command mode.

For example, in the video mode, the input image data IMG may be transmitted from the host processor 10 to the display device 20 in real time. In this case, the frame data FD may include the input image data IMG and synchronization signals. The display device 20 may receive the input image data IMG and the synchronization signals from the host processor 10 to refresh the display panel 100.

For example, the synchronization signals may include a vertical sync start (VSS) signal, a vertical sync end (VSE) signal, a horizontal sync start (HSS) signal, a horizontal sync end (HSE) signal, and the like. The vertical sync start signal may indicate a start of a frame, and the vertical sync end signal may indicate an end of the frame. The display device may receive the vertical sync start signal to start refreshing the display panel 100.

For example, in the command mode, the display device 20 may receive and store the input image data IMG in a frame memory. For example, the frame memory may be located within the display device 20. The display device 20 may refresh the display panel 100 with the input image data IMG stored in the frame memory in synchronization with the synchronization signals generated inside the display device 20. In addition, the display device 20 may provide a refresh control signal TE to the host processor 10 according to refresh timing (i.e., for each frame). The refresh timing may be based on the synchronization signals generated inside the display device 20. The host processor 10 may provide the input image data IMG to the display device 20 in response to the refresh control signal TE. Thus, the refresh of the display panel 100 may be determined mainly by the display device 20 in the command mode.

However, in the video mode, the refresh of the display panel 100 may be determined mainly by the host processor 10.

In an embodiment, in the video mode, the display device 20 provides the refresh control signal TE to the host processor 10 under a specific condition, so that problems caused by the refresh depending only on the host processor 10 may be prevented. The above configuration will be described in detail below.

The frame data lane and the clock lane may transmit the frame data FD and the clock signal CLK having mutually different frequencies and swing levels according to an operation mode (e.g., a low-power mode (LP of FIG. 4), a high-speed mode (HS of FIG. 4), etc.).

For example, the frame data FD and the clock signal CLK may be differential signals in the high-speed mode. For example, in the high-speed mode, the frame data FD and the clock signal CLK may have a data transmission rate of maximum 2.5 gigabits per second (Gb/s) in one lane. For example, in the high-speed mode, the frame data FD and the clock signal CLK may be transmitted using a scalable low-voltage signaling (SLVS) transmission scheme. For example, the SLVS transmission scheme may transmit data having a DC voltage of 200 milivolt (mV) and a swing voltage of 100 mV. For example, the SLVS transmission scheme may transmit data having a voltage value of 100 mV to 300 mV. For example, the input image data IMG and the synchronization signals may be transmitted in the high-speed mode HS.

For example, the frame data FD and the clock signal CLK may be single-ended signals in the low-power mode. For example, in the low-power mode, the frame data FD and the clock signal CLK may have a data transmission rate of maximum 10 megabits per second (Mb/s) in one lane. For example, in the low-power mode, the frame data FD and the clock signal CLK may be transmitted in a low-voltage CMOS (LVCMOS) transmission scheme. For example, the LVCMOS transmission scheme may transmit data having a voltage value of 0V to 1.2V. For example, a command such as power-on/off or reset may be transmitted in the low-power mode LP.

Hereinafter, FIGS. 3 to 9 show an operation of the display system in the video mode. Therefore, reference to the video mode will be omitted in the following description.

Figure 3:
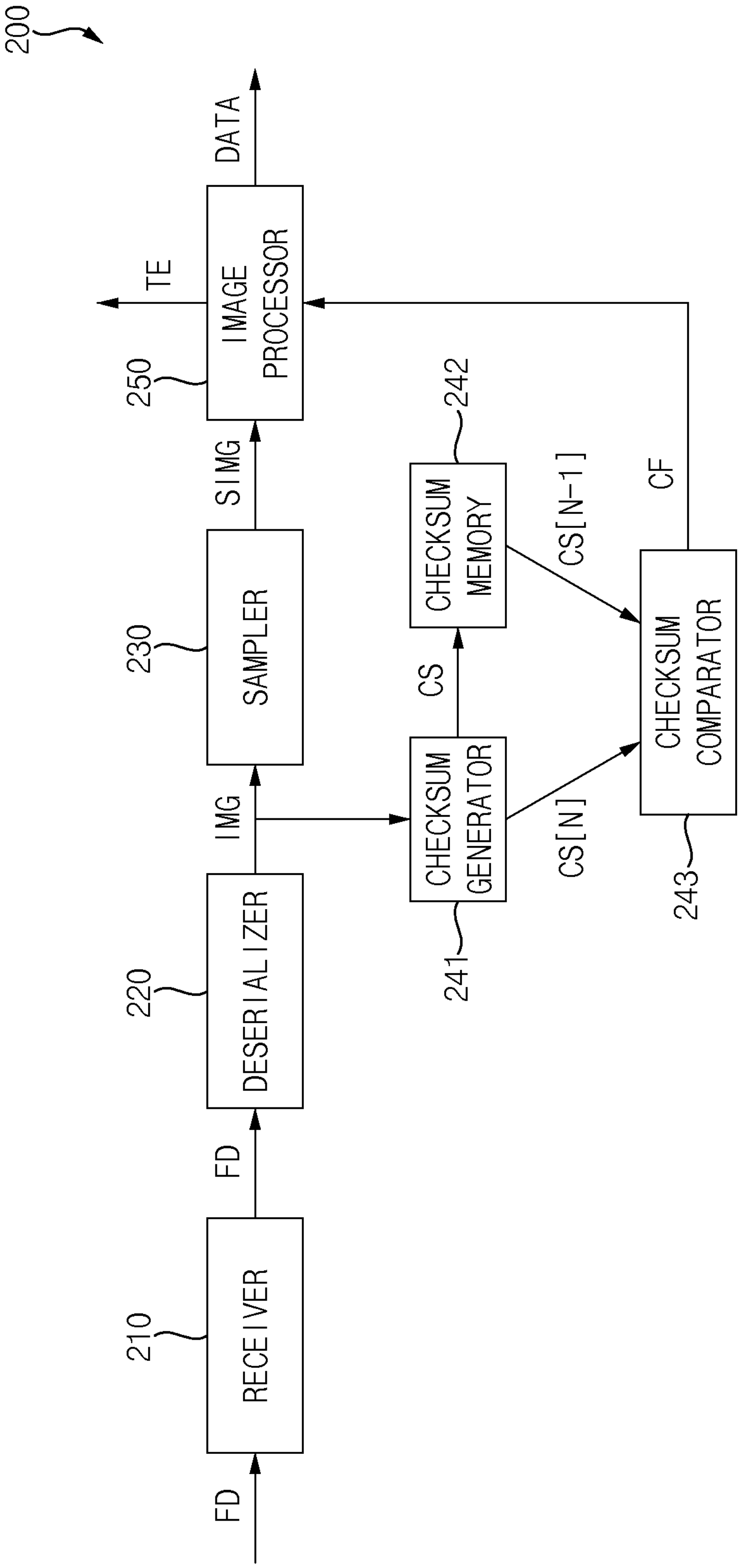
FIG. 3 is a block diagram showing an example of a timing controller of FIG. 2.

FIG. 3 is a block diagram showing an example of a timing controller 200 of FIG. 2.

Referring to FIGS. 1 to 3, the display device 20 may compare the input image data IMG of a previous frame with the input image data IMG of a current frame to provide the refresh control signal TE to the host processor 10. For example, the display device 20 may provide the refresh control signal TE to the host processor 10 when the input image data IMG of the previous frame is different from the input image data IMG of the current frame.

According to an embodiment, the display device 20 compares a checksum value of the input image data IMG of the previous frame with a checksum value of the input image data IMG of the current frame to provide the refresh control signal TE to the host processor 10. For example, the display device 20 may provide the refresh control signal TE to the host processor 10 when the checksum value of the input image data IMG of the previous frame is different from the checksum value of the input image data IMG of the current frame. For example, the display device 20 may provide the refresh control signal TE to the host processor 10 when the checksum value of the input image data IMG of the current frame is outside a predetermined range from the checksum value of the input image data IMG of the previous frame.

According to an embodiment, the display device 20 compares a cyclic redundancy check value of the input image data IMG of the previous frame with a cyclic redundancy check value of the input image data IMG of the current frame to provide the refresh control signal TE to the host processor 10. For example, the display device 20 may provide the refresh control signal TE to the host processor 10 when the cyclic redundancy check value of the input image data IMG of the previous frame is different from the cyclic redundancy check value of the input image data IMG of the current frame. For example, the display device 20 may provide the refresh control signal TE to the host processor 10 when the cyclic redundancy check value of the input image data IMG of the current frame is outside a predetermined range from the cyclic redundancy check value of the input image data IMG of the previous frame.

Hereinafter, FIGS. 3 to 8 show use of a checksum value.

The timing controller 200 may include a receiver 210, a deserializer 220 (e.g., a deserializer circuit), a sampler 230 (e.g., a sampler circuit), a checksum generator 241 (e.g., a logic circuit), a checksum memory 242, a checksum comparator 243 (e.g., a comparison circuit), and an image processor 250.

The receiver 210 may receive the frame data FD from the host processor 10. For example, the receiver 210 may correspond to a physical layer of the MIPI protocol. The physical layer of the MIPI protocol may be configured according to various predetermined specifications such as D-PHY, C-PHY, and M-PHY. The receiver 210 may output the frame data FD to the deserializer 220 without performing an operation on the frame data FD.

The deserializer 220 may convert the frame data FD, which is serial data, into image data IMG such as parallel data. The deserializer 220 may provide the input image data IMG included in the frame data FD to the checksum generator 241 and the sampler 230.

The sampler 230 may sample the input image data IMG to generate sampled input image data SIMG, and provide the sampled input image data SIMG to the image processor 250. For example, the receiver 210 and the deserializer 220 may be analog blocks or circuits. For example, the sampler 230 may sample an analog signal received from the deserializer 220.

The checksum generator 241 may receive the input image data IMG to generate a checksum value CS. The checksum generator 241 may provide the checksum value CS to the checksum memory 242 and the checksum comparator 243. The checksum memory 242 may store the received checksum value CS, and provide the stored checksum value CS to the checksum comparator 243.

For example, the checksum generator 241 may provide a checksum value CS[N] of the input image data IMG of the current frame to the checksum comparator 243. For example, the checksum memory 242 may provide the checksum value CS received in the previous frame (i.e., a checksum value CS[N−1] of the input image data IMG of the previous frame) to the checksum comparator 243. Therefore, the checksum comparator 243 may compare the checksum value CS[N] of the input image data IMG of the current frame with the checksum value CS[N−1] of the input image data IMG of the previous frame.

The checksum comparator 243 may compare the checksum value CS[N] of the input image data IMG of the current frame with the checksum value CS[N−1] of the input image data IMG of the previous frame to generate a checksum flag value CF, and provide the checksum flag value CF to the image processor 250.

According to an embodiment, the checksum comparator 243 may convert the checksum flag value CF when the checksum value CS[N] of the input image data IMG of the current frame is different from the checksum value CS[N−1] of the input image data IMG of the previous frame. For example, the checksum comparator 243 may convert the checksum flag value CF from a low voltage level to a high voltage level, or from the high voltage level to the low voltage level.

The image processor 250 may generate the data signal DATA by performing data processing on the sampled input image data SIMG. According to an embodiment, the data processing performed by the image processor 250 may include, but is not limited to, PenTile data conversion for converting RGB image data into image data suitable for a PenTile pixel structure, luminance compensation, color correction, and the like. In addition, according to an embodiment, the image processor 250 receives the checksum flag value CF to provide the refresh control signal TE to the host processor 10. For example, the image processor 250 may detect an edge of the checksum flag value CF to provide the refresh control signal TE to the host processor 10. For example, the checksum comparator 243 may maintain the checksum flag value CF at a low voltage while a checksum value CS[N] of the input image data IMG of the current frame is the same as the checksum value CS[N−1] of the input image data IMG of the previous frame, change the checksum flag value CF to a high voltage when the checksum value CS[N] becomes different from the checksum value CS[N−1] to create an edge, and then the image processor 250 can provide the refresh control signal TE in response to the edge.

Figure 4:
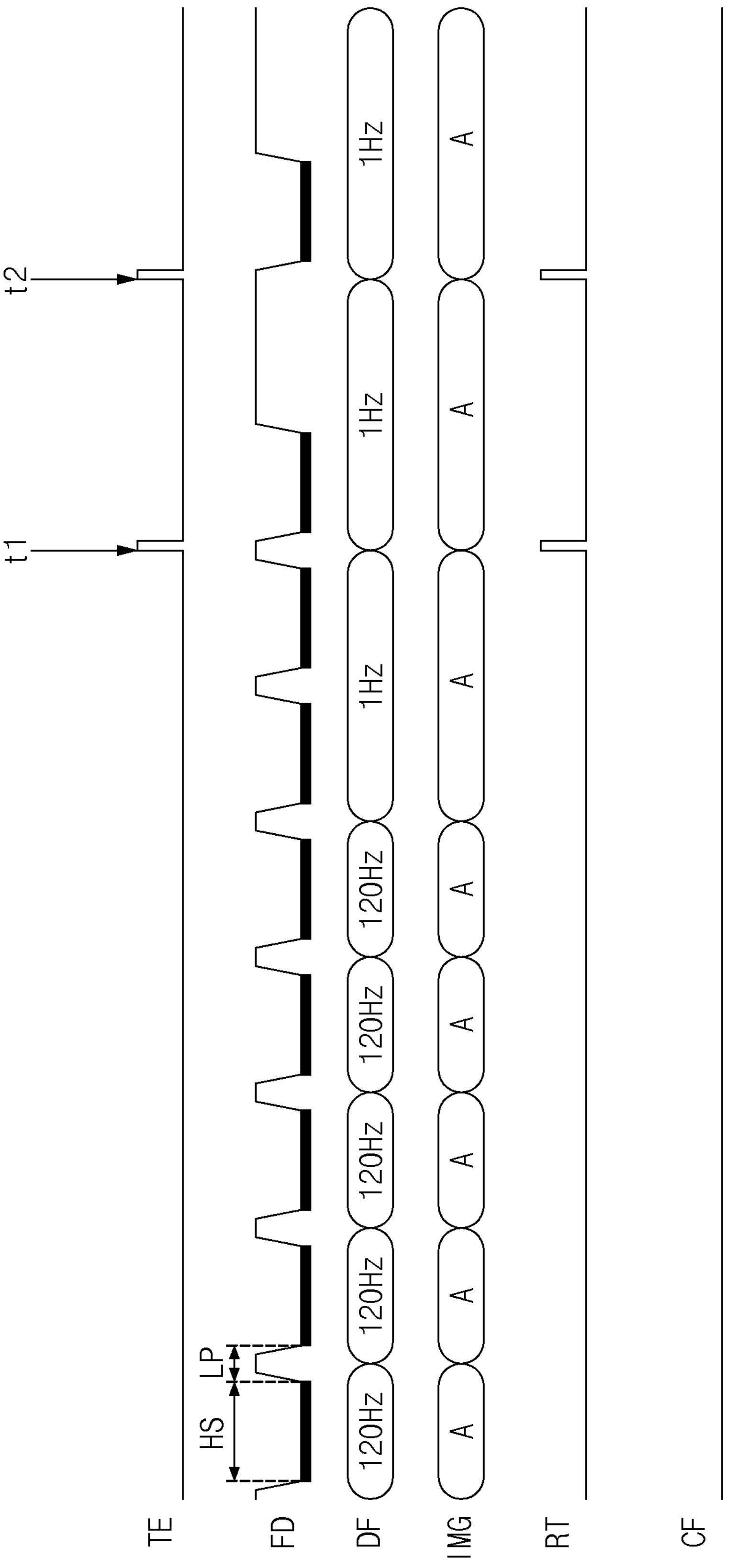
FIG. 4 is a timing diagram showing an example of driving the display system of FIG. 1.

FIG. 4 is a timing diagram showing an example of driving the display system of FIG. 1.

Referring to FIGS. 1 to 4, the host processor 10 may provide the input image data IMG for each frame and the vertical sync start signal to the display device 20. For example, the input image data IMG and the vertical sync start signal may be included in the frame data FD in the high-speed mode HS. For example, in one frame, the vertical sync start signal may be provided to the display device 20 prior to the input image data IMG. The display device 20 may receive the input image data IMG and the vertical sync start signal to refresh the display panel 100.

The display device 20 may count at each reference time to accumulate a count value when the display device 20 receives the vertical sync start signal, and provide the refresh control signal TE to the host processor 10 when the count value reaches a reference count value. For example, the display device 20 may initialize the count value to 0 upon receiving the vertical sync start signal and increment the count value by 1 each reference time. According to an embodiment, the reference count value may be a preset value. According to an embodiment, the count value is reset when the display device receives the vertical sync start signal. For example, reset of the count value may cause the count value to be set to 0.

For example, it will be assumed that the reference time is 0.1 second, and the reference count value is a count value corresponding to a driving frequency DF of 1 Hz. In this case, a length of one frame may be 1 second at the driving frequency of 1 Hz. In addition, the display device 20 may generate a refresh timeout (RT) signal when the count value reaches 10. The display device 20 may provide the refresh control signal TE to the host processor 10 in response to the refresh timeout (RT) signal.

According to an embodiment, the reference count value is a count value corresponding to a minimum driving frequency. For example, when the display device 20 has a driving frequency within a range of 1 Hz to 120 Hz, the minimum driving frequency may be 1 Hz. However, the reference count value according to the present disclosure is not limited to the minimum driving frequency.

The host processor 10 may provide the input image data IMG and the vertical sync start signal to the display device 20 when the host processor 10 receives the refresh control signal TE from the display device 20. The display device 20 may receive the input image data IMG and the vertical sync start signal to refresh the display panel 100.

In other words, in a case where the refresh of the display panel 100 depends only on the host processor 10 in the video mode, the refresh of the display panel 100 may not be performed even when a time corresponding to the minimum driving frequency elapses. In this case, a luminance may vary due to leakage of transistors constituting the pixels P. Therefore, the display system may generate the refresh control signal TE when the display panel 100 has not been refreshed for a predetermined time (e.g., the minimum driving frequency), so that the luminance variation caused by the leakage of the transistors constituting the pixels P may be reduced.

Figure 5:
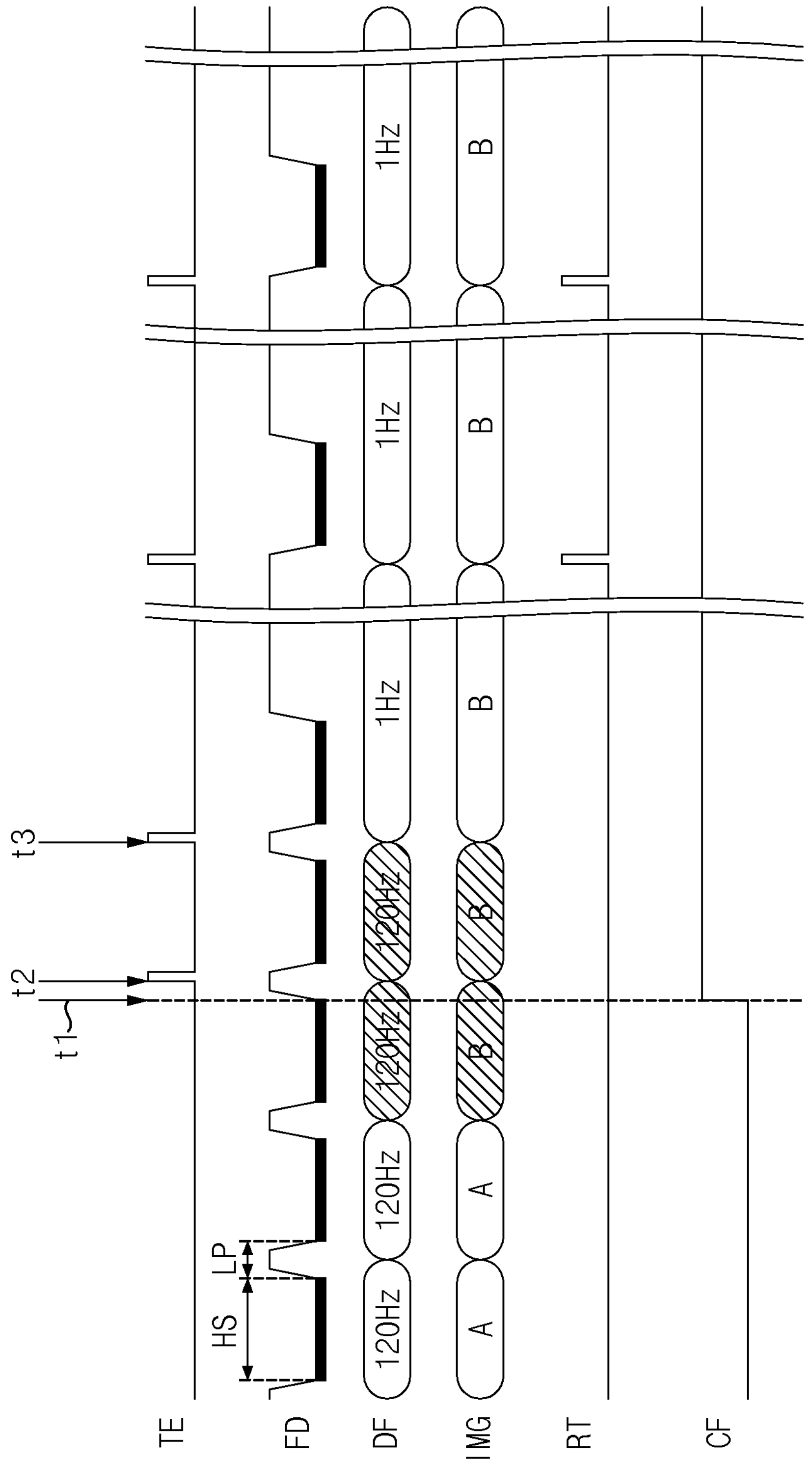
FIG. 5 is a timing diagram showing an example of driving the display system of FIG. 1.

FIG. 5 is a timing diagram showing an example of driving the display system of FIG. 1.

Referring to FIGS. 1 to 3 and 5, the display device 20 may compare the input image data IMG of the previous frame with the input image data IMG of the current frame to provide the refresh control signal TE to the host processor 10. For example, the display device 20 may provide the refresh control signal TE to the host processor 10 based on a result of the compare. For example, the comparison between the input image data IMG of the previous frame and the input image data IMG of the current frame may be performed by using the cyclic redundancy check values or the checksum values described above.

According to an embodiment, the display device 20 provides the refresh control signal TE to the host processor 10 when the input image data IMG of the previous frame is different from the input image data IMG of the current frame. According to an embodiment, the display device 20 compares the input image data IMG of the previous frame with the input image data IMG of the current frame to provide the refresh control signal TE to the host processor 10 as a reference frequency. According to an embodiment, the display device compares the input image data IMG of the previous frame with the input image data IMG of the current frame to provide the refresh control signal TE to the host processor 10 N times. For example, N may be a positive integer greater than or equal to 2. For example, the reference frequency may be a preset value.

For example, the display device 20 may convert the checksum flag value CF when the input image data IMG of the previous frame is different from the input image data IMG of the current frame. When an edge of the checksum flag value CF is detected, the display device 20 may provide the refresh control signal TE to the host processor 10 so that the current frame is driven at a driving frequency DF that is equal to the reference frequency. In addition, the display device 20 may provide the refresh control signal TE as the reference frequency N times.

Although the display device 20 has been illustrated in the present embodiment as completing the comparison when the high-speed mode HS ends, the present disclosure is not limited thereto. For example, the display device 20 may complete the reception and the comparison of the input image data IMG before the high-speed mode HS ends.

FIG. 5 shows an example in which the display device 20 compares the input image data IMG of the previous frame with the input image data IMG of the current frame to provide the refresh control signal TE to the host processor 10 at a frequency of 120 Hz (i.e., the reference frequency is 120 Hz), and N is 2.

For example, at a first time point t1, the display device 20 completes the comparison between the input image data IMG of the previous frame and the input image data IMG of the current frame. Since the input image data IMG of the previous frame is data of an image A, and the input image data IMG of the current frame is data of an image B, the checksum flag value CF may be converted. The converting may cause the checksum flag value CF to be changed from a low voltage level to a high voltage level, and the display device 20 may detect an edge of the checksum flag value CF.

For example, at a second time point t2, the display device 20 may provide the refresh control signal TE to the host processor 10. Accordingly, the current frame may be driven at a driving frequency DF of 120 Hz. The host processor 10 provides the vertical sync start signal and the input image data IMG to the display device 20 again in response to the refresh control signal TE. For example, the host processor 10 may provide the input image data IMG of the current frame (i.e., based on image B) again to the display device 20. Thus, the display device 20 may refresh the display panel 100 again with the input image data IMG of the image B.

In an embodiment, the host processor 10 provides the input image data IMG of each frame and vertical sync start signal periodically to the display device 20 independent of the display device 20 during a first period to enable the display device 20 to refresh its display panel 100 with each frame, the display device 20 outputs a refresh control signal TE to the host processor 10 upon determining that the checksum flag value CF has changed during a second period after the first period, and then the host processor 10 provides the input image data of the last frame again to the display device 20 along with the vertical sync start signal during a third period after the second period in response to receiving the refresh control signal TE to enable the display device 20 to refresh its display panel 100 again with the last frame.

For example, at a third point in time t3, the display device 20 may provide the refresh control signal TE to the host processor 10 at 120 Hz (i.e., N is 2). The host processor 10 may provide the vertical sync start signal and the input image data IMG to the display device 20 again in response to the refresh control signal TE. In addition, the display device 20 may refresh the display panel 100 again with the input image data IMG of the image B.

Therefore, the display system may insert a new frame. Accordingly, the display system may prevent motion blur caused by step efficiency.

According to an embodiment, the reference frequency is a maximum driving frequency. For example, the display device 20 may compare the input image data IMG of the previous frame with the input image data IMG of the current frame to provide the refresh control signal TE to the host processor 10 at the maximum driving frequency. For example, when the display device 20 has a driving frequency within a range of 1 Hz to 120 Hz, the maximum driving frequency may be 120 Hz. Accordingly, the display system may insert a new frame at a high frequency, so that motion blur may be minimized. However, the present disclosure is not limited to the maximum driving frequency.

According to an embodiment, the display device 20 compares the input image data IMG of the previous frame with the input image data IMG of the current frame to provide the refresh control signal TE to the host processor 10 when the driving frequency DF is lower than the reference frequency. Low-frequency driving (i.e., a low driving frequency DF) having a wide refresh interval may be vulnerable to motion blur. The reference frequency may be a preset value. Accordingly, the display system may insert a new frame during the low-frequency driving that is relatively vulnerable to motion blur, so that motion blur may be minimized. For example, as shown in FIG. 4, when the display device 20 receives the input image data IMG at a driving frequency of 1 Hz (i.e., the low-frequency driving), motion blur may be minimized through the frame insertion. In an embodiment, the host processor 10 provides the input image data IMG of each frame and vertical sync start signal periodically to the display device 20 independent of the display device 20 during a first period to enable the display device 20 to refresh its display panel 100 with each frame, the display device 20 outputs a refresh control signal TE to the host processor 10 upon determining that motion blur is likely to occur such as when the driving frequency DF has become lower than a reference frequency during a second period after the first period, and then the host processor 10 provides the input image data of the last frame again to the display device 20 along with the vertical sync start signal during a third period after the second period in response to receiving the refresh control signal TE to enable the display device 20 to refresh its display panel 100 again with the last frame.

Figure 6:
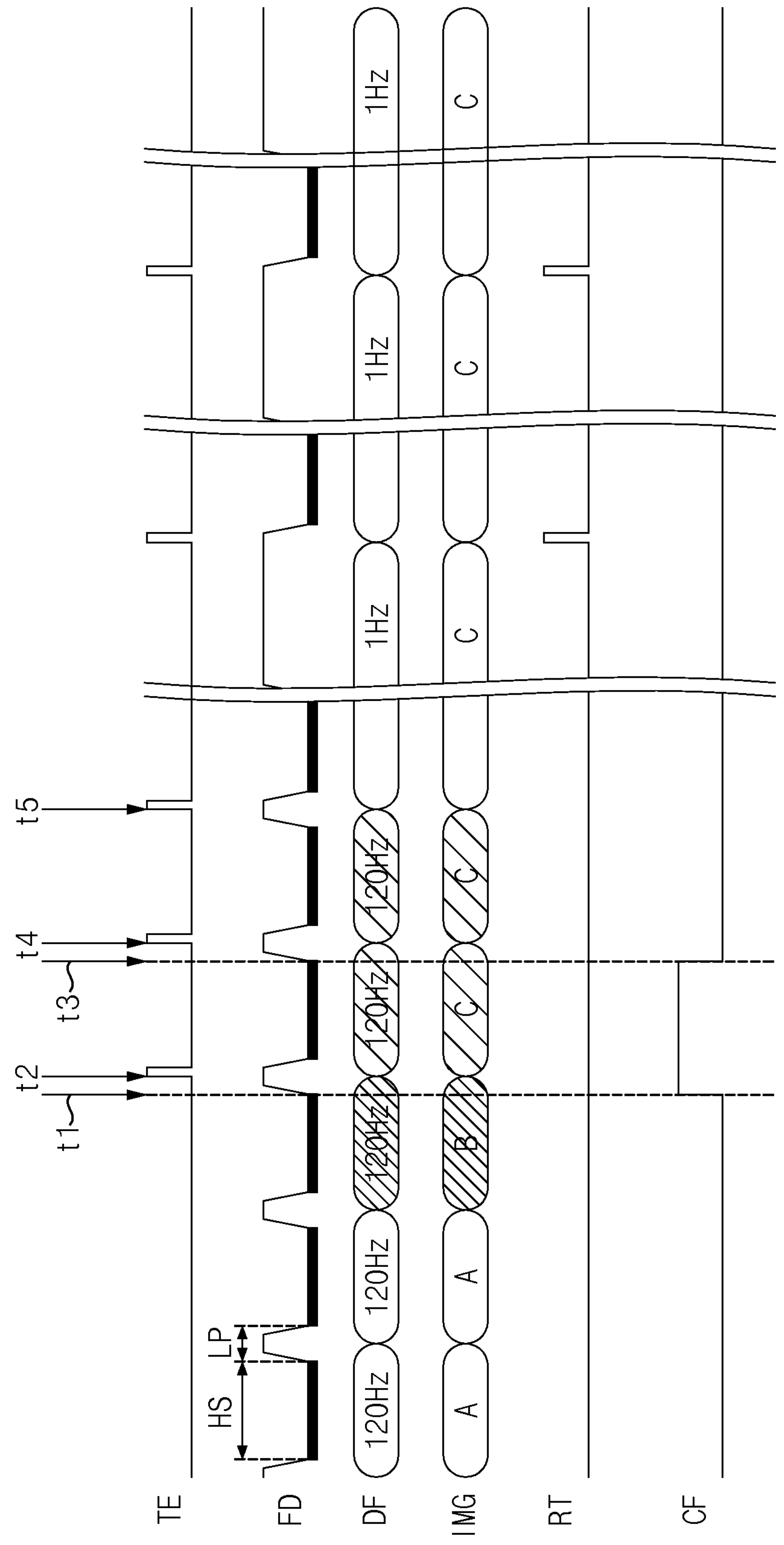
FIG. 6 is a timing diagram showing an example of driving the display system of FIG. 1.

FIG. 6 is a timing diagram showing an example of driving the display system of FIG. 1.

Referring to FIGS. 1 to 3 and 6, the display device 20 may compare the input image data IMG of the previous frame with the input image data IMG of the current frame to provide the refresh control signal TE to the host processor 10. For example, the comparison between the input image data IMG of the previous frame and the input image data IMG of the current frame may be performed by using the cyclic redundancy check values or the checksum values described above.

FIG. 6 shows an example in which the display device 20 compares the input image data IMG of the previous frame with the input image data IMG of the current frame to provide the refresh control signal TE to the host processor 10 at a frequency of 120 Hz (i.e., the reference frequency is 120 Hz), and N is 2.

For example, at a first time point t1, the display device 20 may complete the comparison between the input image data IMG of the previous frame and the input image data IMG of the current frame. Since the input image data IMG of the previous frame is data of an image A, and the input image data IMG of the current frame is data of an image B, the checksum flag value CF may be converted. Therefore, the checksum flag value CF may be changed from a low voltage level to a high voltage level, and the display device 20 may detect an edge of the checksum flag value CF.

For example, at a second time point t2, the display device 20 may provide the refresh control signal TE to the host processor 10. Accordingly, the current frame may be driven at a driving frequency DF of 120 Hz. The host processor 10 may provide the vertical sync start signal and the input image data IMG to the display device 20 again in response to the refresh control signal TE. However, when the host processor 10 finishes rendering the input image data IMG of an image C at the second time point t2, the host processor 10 may provide the input image data IMG of the image C to the display device 20 at 1 Hz.

For example, at a third time point t3, the display device 20 may complete the comparison between the input image data IMG of the previous frame and the input image data IMG of the current frame. Since the input image data IMG of the previous frame is data of the image B, and the input image data IMG of the current frame is data of the image C, the checksum flag value CF may be converted. Therefore, the checksum flag value CF may be changed from the high voltage level to the low voltage level, and the display device 20 may detect an edge of the checksum flag value CF.

For example, at a fourth time point t4, the display device 20 may provide the refresh control signal TE to the host processor 10. Accordingly, the current frame may be driven at the driving frequency DF of 120 Hz. The host processor 10 may provide the vertical sync start signal and the input image data IMG to the display device 20 again in response to the refresh control signal TE. In addition, the display device 20 may refresh the display panel 100 again with the input image data IMG of the image C.

For example, at a fifth time point t5, the display device 20 may provide the refresh control signal TE to the host processor 10 at 120 Hz (i.e., N is 2). The host processor 10 may provide the vertical sync start signal and the input image data IMG to the display device 20 again in response to the refresh control signal TE. In addition, the display device 20 may refresh the display panel 100 again with the input image data IMG of the image C.

Figure 7:
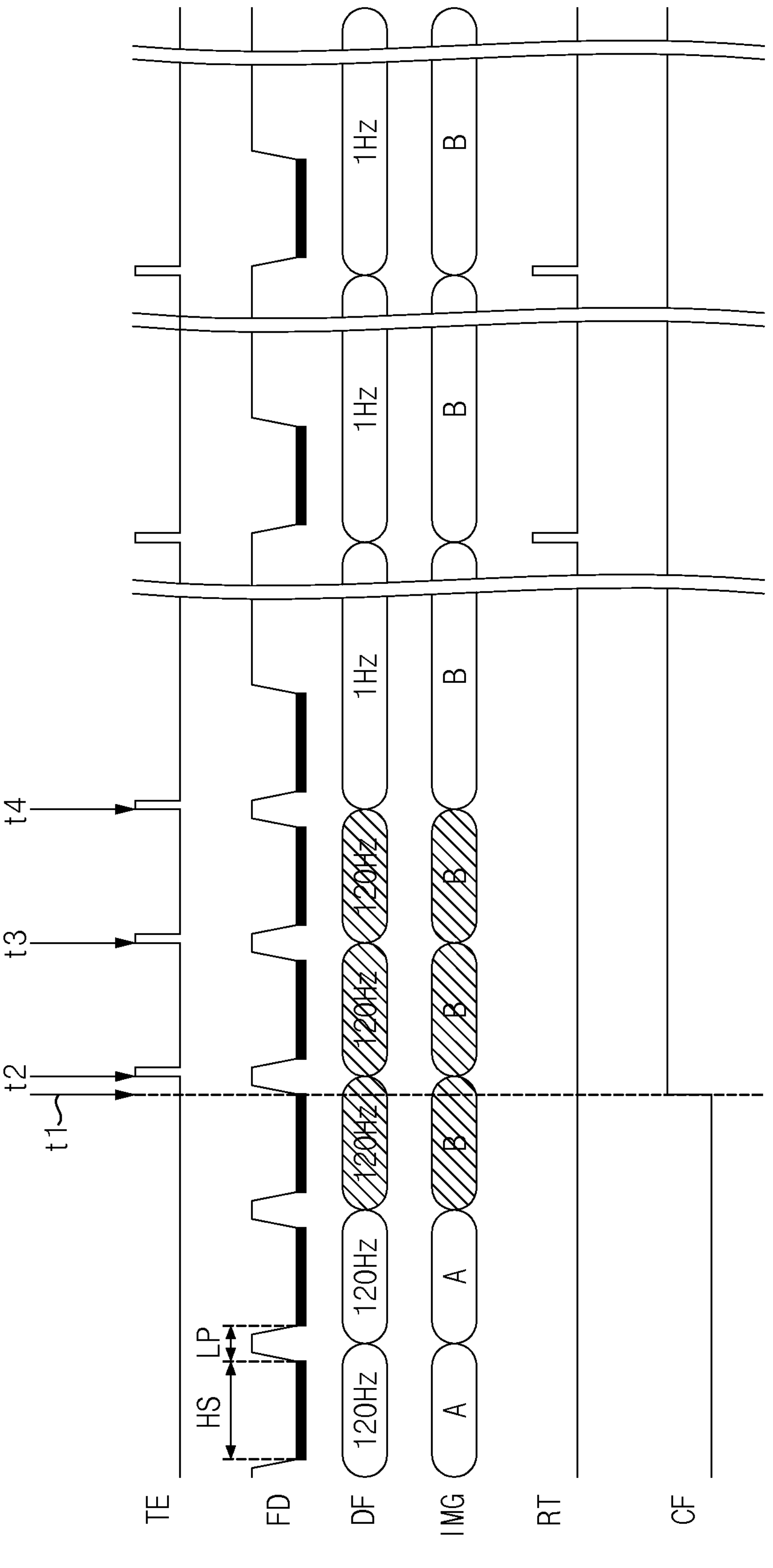
FIG. 7 is a timing diagram showing an example of driving a display system according to an embodiment of the present disclosure.

FIG. 7 is a timing diagram showing an example of driving a display system according to an embodiment of the present disclosure.

Since a display system according to the present embodiment has a configuration that is substantially identical to the configuration of the display system of FIG. 1 except for N, the same reference numerals and reference signs will be used for the same or similar components, and redundant descriptions will be omitted.

Referring to FIGS. 1 to 3 and 7, the display device 20 may compare the input image data IMG of the previous frame with the input image data IMG of the current frame to provide the refresh control signal TE to the host processor 10. For example, the comparison between the input image data IMG of the previous frame and the input image data IMG of the current frame may be performed by using the cyclic redundancy check values or the checksum values described above.

FIG. 7 shows an example in which the display device 20 compares the input image data IMG of the previous frame with the input image data IMG of the current frame to provide the refresh control signal TE to the host processor 10 at a frequency of 120 Hz (i.e., the reference frequency is 120 Hz), and N is 3.

For example, at a first time point t1, the display device 20 may complete the comparison between the input image data IMG of the previous frame and the input image data IMG of the current frame. Since the input image data IMG of the previous frame is data of an image A, and the input image data IMG of the current frame is data of an image B, the checksum flag value CF may be converted. Therefore, the checksum flag value CF may be changed from a low voltage level to a high voltage level, and the display device 20 may detect the edge of the checksum flag value CF.

For example, at a second time point t2, the display device 20 may provide the refresh control signal TE to the host processor 10. Accordingly, the current frame may be driven at a driving frequency DF of 120 Hz. The host processor 10 may provide the vertical sync start signal and the input image data IMG to the display device 20 again in response to the refresh control signal TE. In addition, the display device 20 may refresh the display panel 100 again with the input image data IMG of the image B.

For example, at a third time point t3 and a fourth time point t4, the display device 20 may provide the refresh control signal TE to the host processor 10 at 120 Hz (i.e., N is 3). The host processor 10 may provide the vertical sync start signal and the input image data IMG to the display device 20 again in response to the refresh control signal TE. In addition, the display device 20 may refresh the display panel 100 again with the input image data IMG of the image B.

Figure 8:
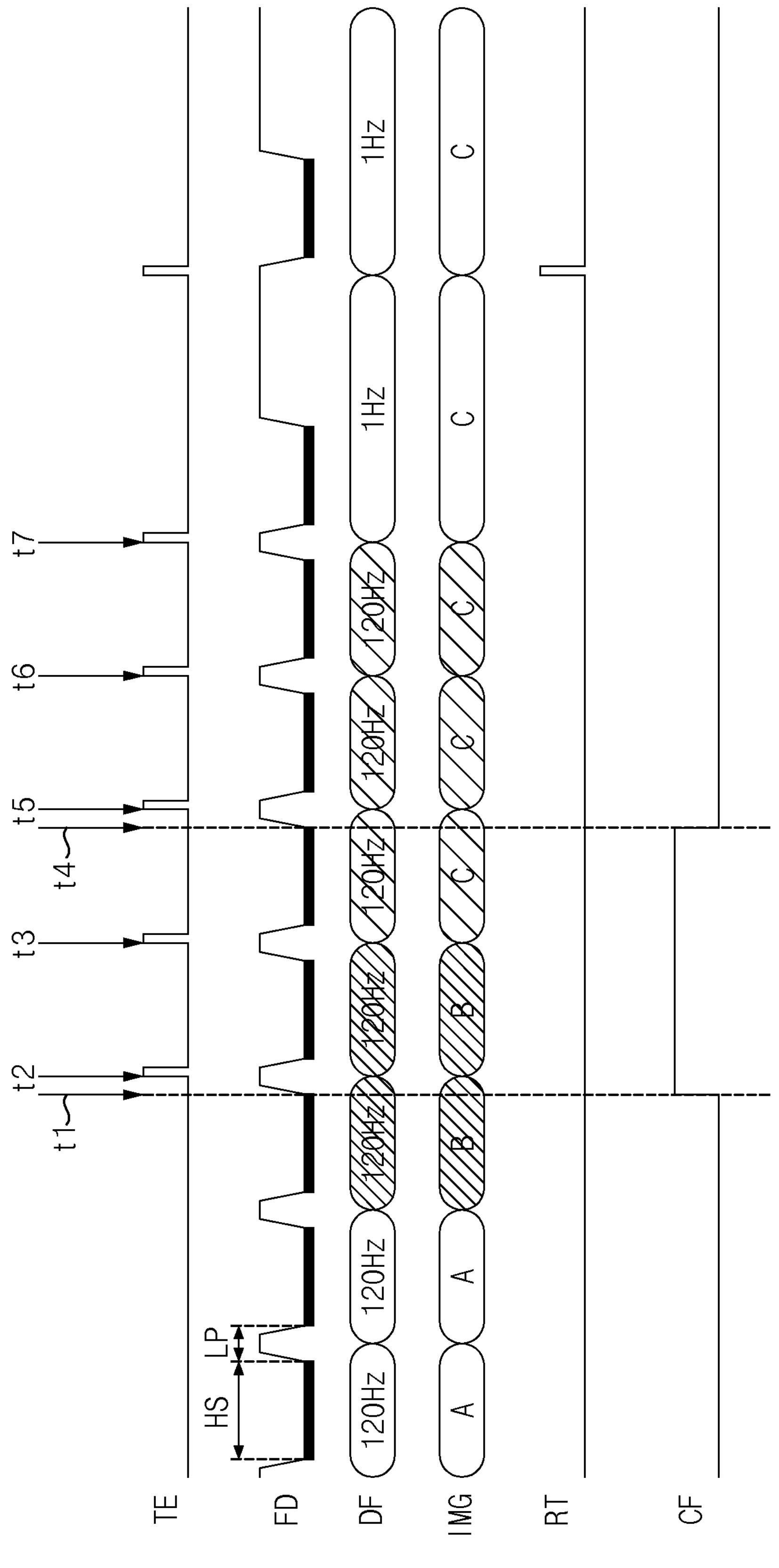
FIG. 8 is a timing diagram showing an example of driving the display system of FIG. 7.

FIG. 8 is a timing diagram showing an example of driving the display system of FIG. 7.

Referring to FIGS. 1 to 3 and 8, the display device 20 may compare the input image data IMG of the previous frame with the input image data IMG of the current frame to provide the refresh control signal TE to the host processor 10. For example, the comparison between the input image data IMG of the previous frame and the input image data IMG of the current frame may be performed by using the cyclic redundancy check values or the checksum values described above.

FIG. 8 shows an example in which the display device 20 compares the input image data IMG of the previous frame with the input image data IMG of the current frame to provide the refresh control signal TE to the host processor 10 at a frequency of 120 Hz (i.e., the reference frequency is 120 Hz), and N is 3.

For example, at a first time point t1, the display device 20 may complete the comparison between the input image data IMG of the previous frame and the input image data IMG of the current frame. Since the input image data IMG of the previous frame is data of an image A, and the input image data IMG of the current frame is data on an image B, the checksum flag value CF may be converted. Therefore, the checksum flag value CF may be changed from a low voltage level to a high voltage level, and the display device 20 may detect the edge of the checksum flag value CF.

For example, at a second time point t2, the display device 20 may provide the refresh control signal TE to the host processor 10. Accordingly, the current frame may be driven at a driving frequency DF of 120 Hz. The host processor 10 may provide the vertical sync start signal and the input image data IMG to the display device 20 again in response to the refresh control signal TE. In addition, the display device 20 may refresh the display panel 100 again with the input image data IMG of the image B.

For example, at a third point in time t3, the display device 20 may provide the refresh control signal TE to the host processor 10 at 120 Hz (i.e., N is 3). The host processor 10 may provide the vertical sync start signal and the input image data IMG to the display device 20 again in response to the refresh control signal TE. However, when the host processor 10 finishes rendering the input image data IMG of an image C at the third time point t3, the host processor 10 may provide the input image data IMG of the image C to the display device 20 at 1 Hz.

For example, at a fourth time point t4, the display device 20 may complete the comparison between the input image data IMG of the previous frame and the input image data IMG of the current frame. Since the input image data IMG of the previous frame is data of the image B, and the input image data IMG of the current frame is data of the image C, the checksum flag value CF may be converted. Therefore, the checksum flag value CF may be changed from the high voltage level to the low voltage level, and the display device 20 may detect an edge of the checksum flag value CF.

For example, at a fifth time point t5, the display device 20 may provide the refresh control signal TE to the host processor 10. Accordingly, the current frame may be driven at the driving frequency DF of 120 Hz. The host processor 10 may provide the vertical sync start signal and the input image data IMG to the display device 20 again in response to the refresh control signal TE. In addition, the display device 20 may refresh the display panel 100 again with the input image data IMG of the image C.

For example, at a sixth time point t6 and a seventh time point t7, the display device 20 may provide the refresh control signal TE to the host processor 10 at 120 Hz (i.e., N is 3). The host processor 10 may provide the vertical sync start signal and the input image data IMG to the display device 20 again in response to the refresh control signal TE. In addition, the display device 20 may refresh the display panel 100 again with the input image data IMG of the image C.

Figure 9:
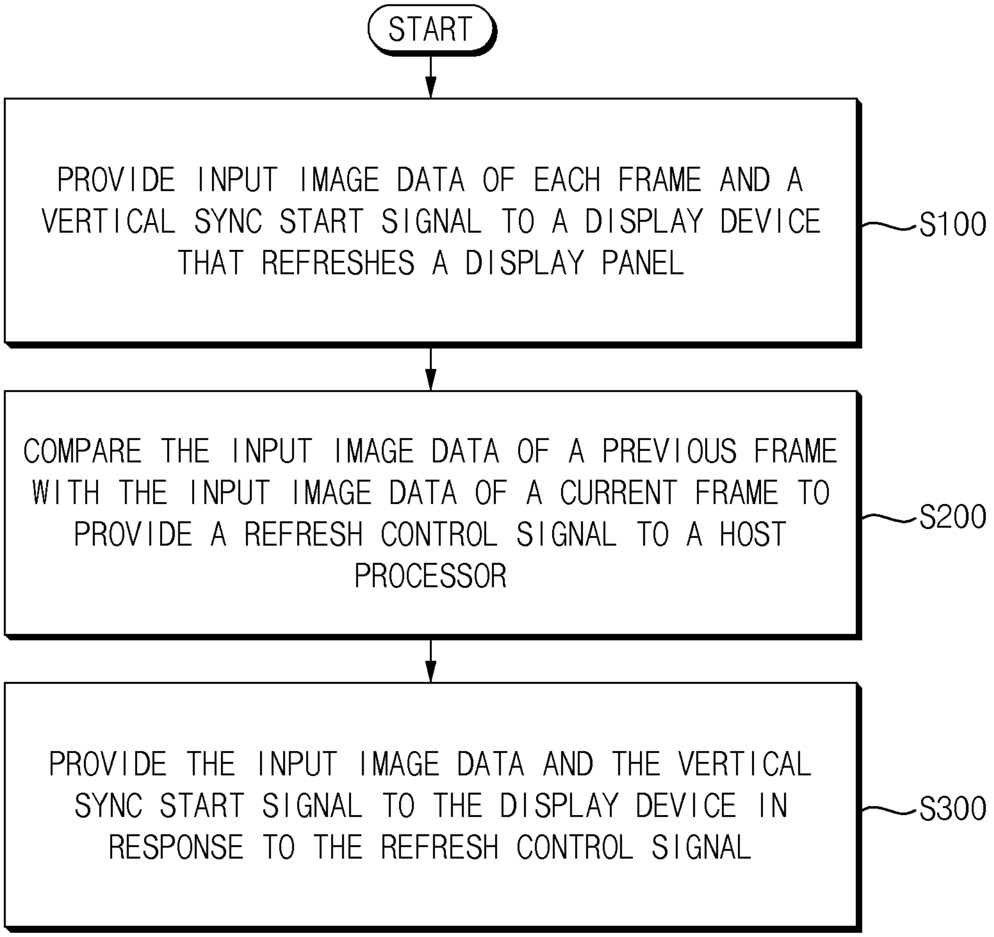
FIG. 9 is a flowchart showing a method for driving a display system according to an embodiment of the present disclosure.

FIG. 9 is a flowchart showing a method for driving a display system according to an embodiment of the present disclosure.

Referring to FIG. 9, a method for driving a display system is provided. The method of FIG. 9 includes providing input image data and a vertical sync start signal to a display device, which is configured to receive the input image data of each frame and the vertical sync start signal to refresh a display panel (S100). The method of FIG. 9 further includes the display device comparing the input image data of a previous frame with the input image data of a current frame to provide a refresh control signal to a host processor, which is configured to provide the input image data and the vertical sync start signal to the display device (S200). The method of FIG. 9 further includes the host processor providing the input image data and the vertical sync start signal to the display device in response to the refresh control signal (S300).

In detail, the display system of FIG. 9 may provide the input image data and the vertical sync start signal to the display device, which is configured to receive the input image data of each frame and the vertical sync start signal to refresh the display panel (S100).

In detail, the display system of FIG. 9 may compare the input image data of the previous frame with the input image data of the current frame to provide the refresh control signal to the host processor, which is configured to provide the input image data and the vertical sync start signal to the display device (S200). According to an embodiment, the display device provides the refresh control signal to the host processor when the input image data of the previous frame is different from the input image data of the current frame. For example, the display device may compare a checksum value of the input image data of the previous frame with a checksum value of the input image data of the current frame to provide the refresh control signal to the host processor. For example, the display device may compare a cyclic redundancy check value of the input image data of the previous frame with a cyclic redundancy check value of the input image data of the current frame to provide the refresh control signal to the host processor.

According to an embodiment, the display device compares the input image data of the previous frame with the input image data of the current frame to provide the refresh control signal to the host processor at a predetermined frequency. According to an embodiment, the display device compares the input image data of the previous frame with the input image data of the current frame to provide the refresh control signal to the host processor at a maximum driving frequency.

According to an embodiment, the display device compares the input image data of the previous frame with the input image data of the current frame to provide the refresh control signal to the host processor N times.

According to an embodiment, the display device compares the input image data of the previous frame with the input image data of the current frame to provide the refresh control signal to the host processor when a driving frequency is lower than a reference frequency.

According to an embodiment, the display device counts at each reference time to generate a count value when the display device receives the vertical sync start signal, and provides the refresh control signal to the host processor when the count value reaches a reference count value.

Figure 10:
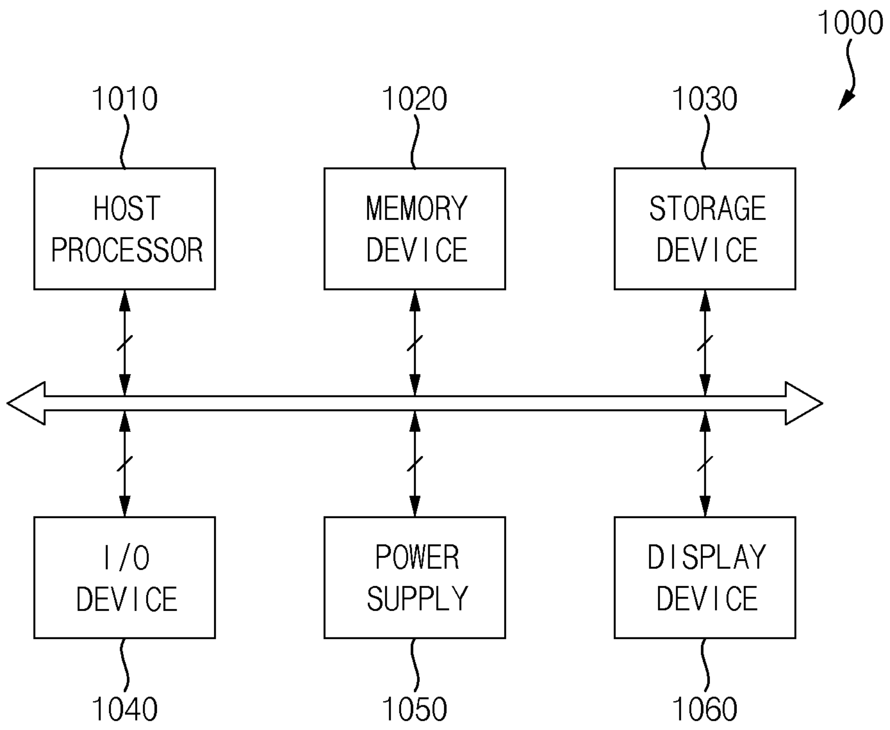
FIG. 10 is a block diagram showing an electronic device according to an embodiment of the present disclosure.
Figure 11:
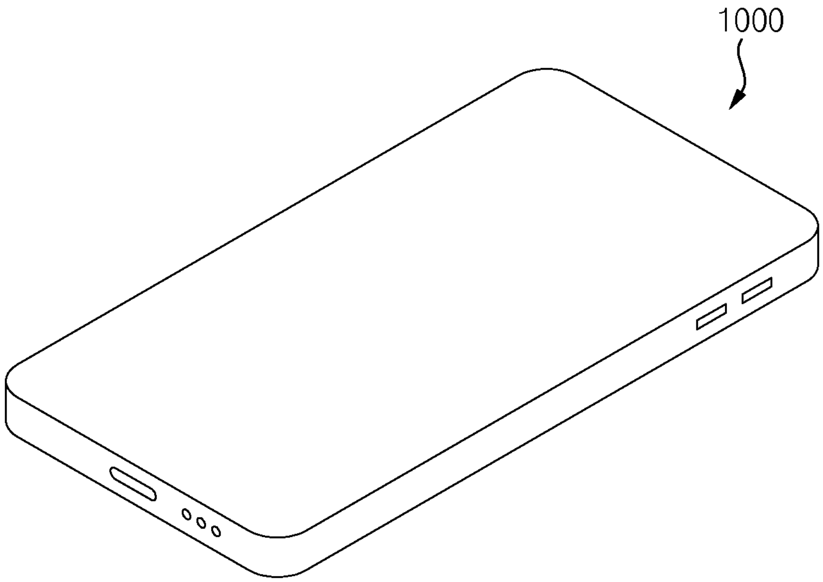
FIG. 11 is a diagram showing an example in which the electronic device of FIG. 10 is implemented as a smart phone.

FIG. 10 is a block diagram showing an electronic device according to an embodiment of the present disclosure, and FIG. 11 is a diagram showing an example in which the electronic device of FIG. 10 is implemented as a smart phone.

Referring to FIGS. 10 and 11, the electronic device 1000 includes a host processor 1010, a memory device 1020, a storage device 1030, an input/output (I/O) device 1040, a power supply 1050, and a display device 1060. Here, the display device 1060 may be the display device of FIG. 2. In addition, the electronic device 1000 may further include a plurality of ports for communicating with a video card, a sound card, a memory card, a universal serial bus (USB) device, other electronic devices, etc. In an embodiment, as shown in FIG. 11, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The host processor 1010 may perform various computing functions. The host processor 1010 may be a micro processor, a central processing unit (CPU), an application processor (AP), etc. The host processor 1010 may be coupled to other components via an address bus, a control bus, a data bus, etc. Further, the host processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch-pad, a touch-screen, etc, and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. In this case, the display device 1060 may be an organic light emitting display device or a quantum dot light emitting display device, but is not limited thereto. The display device 1060 may be connected to other components through the buses or other communication links. Here, the electronic device 1000 may insert a new frame when a new image is refreshed. Accordingly, the electronic device 1000 may prevent motion blur caused by step efficiency.

The present disclosure may be applied to a display device and an electronic device including the display device. For example, the present disclosure may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, etc.

The foregoing is illustrative of embodiments and is not to be construed as limiting thereof. Although a few embodiments have been described, those skilled in the art will readily appreciate that many modifications are possible in the embodiments without materially departing from the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display system comprising:

a display device including a display panel;

a host processor, wherein the host processor provides input image data for a current frame and a vertical sync start signal to the display device, wherein the display device is configured to compare the input image data of a previous frame with the input image data of the current frame, and provide a refresh control signal to the host processor when a result of the compare indicates the input image data of the previous frame is different from the input image data of the current frame, wherein the host processor provides the input image data of the current frame and the vertical sync start signal again to the display device in response to receiving the refresh control signal to enable the display device to refresh the display panel based on the re-provided input image data of the current frame and the re-provided vertical sync start signal.

2. The display system of claim 1, wherein the display device is configured to compare a checksum value of the input image data of the previous frame with a checksum value of the input image data of the current frame to provide the refresh control signal to the host processor.

3. The display system of claim 2, wherein the display device is configured to provide the refresh control signal to the host processor when the checksum value of the input image data of the previous frame is different from the checksum value of the input image data of the current frame.

4. The display system of claim 1, wherein the display device is configured to compare a cyclic redundancy check value of the input image data of the previous frame with a cyclic redundancy check value of the input image data of the current frame to provide the refresh control signal to the host processor.

5. The display system of claim 1, wherein the display device is configured to compare the input image data of the previous frame with the input image data of the current frame to provide the refresh control signal to the host processor at a maximum driving frequency.

6. The display system of claim 1, wherein the display device is configured to compare the input image data of the previous frame with the input image data of the current frame to provide the refresh control signal to the host processor N times, where N is a positive integer greater than or equal to 2.

7. The display system of claim 1, wherein the display device is configured to compare the input image data of the previous frame with the input image data of the current frame to provide the refresh control signal to the host processor when a driving frequency is lower than a reference frequency.

8. The display system of claim 1, wherein the display device is configured to count at each reference time to accumulate a count value when the display device receives the vertical sync start signal and to provide the refresh control signal to the host processor when the count value reaches a reference count value.

9. The display system of claim 8, wherein the count value is reset when the display device receives the vertical sync start signal.

10. The display system of claim 8, wherein the reference count value is a count value corresponding to a minimum driving frequency.

11. The display system of claim 1, wherein the host processor is configured to:

provide, in a first mode, the input image data and the vertical sync start signal to the display device and provide the input image data to the display device when the host processor receives the refresh control signal from the display device; and provide, in a second mode, the input image data to the display device and provide the input image data to the display device when the host processor receives the refresh control signal from the display device, and wherein the display device is configured to:

compare, in the first mode, the input image data of the previous frame with the input image data of the current frame to provide the refresh control signal to the host processor; and provide, in the second mode, the refresh control signal to the host processor for each frame.

12. A method for driving a display system comprising a display device including a display panel, the method comprising:

providing, by a host processor, input image data for a current frame and a vertical sync start signal to the display device;

comparing, by the display device, the input image data of a previous frame with the input image data of the current frame;

providing, by the display device, a refresh control signal to a host processor when a result of the comparing indicates the input image data of the previous frame is different from the input image data of the current frame;

providing, by the host processor, the input image data of the current frame and the vertical sync start signal again to the display device in response to receiving the refresh control signal to enable the display device to refresh the display panel based on the re-provided input image data of the current frame and the re-provided vertical sync start signal.

13. The method of claim 12, wherein the display device is configured to compare a checksum value of the input image data of the previous frame with a checksum value of the input image data of the current frame to provide the refresh control signal to the host processor.

14. The method of claim 12, wherein the display device is configured to compare a cyclic redundancy check value of the input image data of the previous frame with a cyclic redundancy check value of the input image data of the current frame to provide the refresh control signal to the host processor.

15. The method of claim 12, wherein the display device is configured to compare the input image data of the previous frame with the input image data of the current frame to provide the refresh control signal to the host processor at a maximum driving frequency.

16. The method of claim 12, wherein the display device is configured to compare the input image data of the previous frame with the input image data of the current frame to provide the refresh control signal to the host processor N times, where N is a positive integer greater than or equal to 2.

17. The method of claim 12, wherein the display device is configured to compare the input image data of the previous frame with the input image data of the current frame to provide the refresh control signal to the host processor when a driving frequency is lower than a reference frequency.

18. A display device comprising:

a display panel including pixels;

a data driver configured to provide data voltages to the pixels;

a gate driver configured to provide gate signals to the pixels; and a timing controller configured to control the data driver and the gate driver, wherein the timing controller is configured to receive input image data of a current frame and a vertical sync start signal output by an external device, compare the input image data of a previous frame with the input image data of the current frame, and provide a refresh control signal to the external device when a result of the compare indicates the input image data of the previous frame is different from the input image data of the current frame, wherein the external device outputs the input image data of the current frame and the vertical sync start signal again to the display device in response to receiving the refresh control signal to enable the timing controller to refresh the display panel based on the re-output input image data of the current frame and the re-output vertical sync start signal.

* * * * *